Oct. 17, 1961 O. W. HEISE 3,004,434
TEMPERATURE COMPENSATED GAUGE
Filed Nov. 12, 1957

INVENTOR.
OTTO W. HEISE
BY
ATTORNEY.

United States Patent Office 3,004,434
Patented Oct. 17, 1961

3,004,434
TEMPERATURE COMPENSATED GAUGE
Otto W. Heise, Brook Road, Newtown, Conn.
Filed Nov. 12, 1957, Ser. No. 695,696
8 Claims. (Cl. 73—411)

The present invention relates to pressure gauges, and particularly to a new and improved pressure gauge of the Bourdon tube variety.

There are two sources of erroneous readings in Bourdon tube gauges of the precision type, both of which are rendered effective by variations in ambient temperature from that at which the gauge is calibrated at the place of its manufacture.

Precision gauges of this type may be guaranteed to be accurate within one part in one thousand, but this is only true if the gauge is used at an ambient temperature equal to that of the test room in which the gauge was calibrated. Usually, correction charts are required to interpolate the gauge ready for varying temperatures at which it is used.

Nearly all of the operating mechanism of Bourdon tube gauges is composed of metal. Many of the parts may be of metal having the same coefficient of expansion, while many others may be of metals having different coefficients of expansion. Additionally, the mass and length of many of the interconnecting elements, links and levers may vary so that as the temperature rises, there is an over-all growth of all such elements, producing a resulting erroneous movement of the pointer from datum with no pressure within the Bourdon tube. This means that a gauge connected to atmosphere and set for zero with ambient temperature at, say, 70° F. may be in error as much as one and one-half to two percent of scale for a change of 50° in ambient temperature. Where the multiplication is greatest, as in high pressure gauges, the error percentagewise is also greatest.

Probably more serious than the above is the error in gauge reading incident to variations in temperature which affect the modulus of elasticity of the metal forming the Bourdon tube. It is well known that the modulus of elasticity of all metals varies with varying temperature, and, of course, the variation is different for different metals. Thus, the modulus for certain steels employed for Bourdon tubes changes a lesser amount than that for certain alloys such a phosphorous bronze and beryllium copper that also are employed for Bourdon tubes of certain gauges. In other words, as the temperature rises above that at which a gauge was initially calibrated, the Bourdon tube becomes weaker in its resistance to force or pressure, and returns to its normal strength when the ambient temperature is reduced. This results in a greater pointer movement for a given pressure at elevated temperatures than would occur if the ambient temperature were that at which the gauge was originally calibrated.

For extremely precise pressure measurements, the above sources of error require the use of correction curves which increase the possibility of errors in interpreting correction factors, as well as detract from the rapidity with which precise pressure data can be accumulated.

An object of this invention is to provide a Bourdon tube gauge that will automatically compensate throughout its entire scale for errors incident to linear and volume changes of the indicating mechanism due to temperature changes within a predetermined range.

Another object of this invention is to provide such a Bourdon tube gauge in which common compensating means may employed for both the modulus and size changes of the gauge tube and indicating mechanism.

Another object of the invention is to provide a Bourdon tube gauge in which the linear and volume change compensating means is adjustable and can be set to compensate for erroneous movements of the pointer in both directions from datum.

Another object of this invention is to provide a Bourdon tube gauge in which frictionless temperature sensitive means may act on the indicating mechanism to compensate for both size and modulus changes.

One aspect of this invention may be to introduce a temperature responsive linkage between the free end of the Bourdon tube and the multiplying mechanism, and in the embodiment disclosed, it is shown located between the connecting link and the segment slide of the multiplying mechanism of the gauge. This linkage may take the form of a bimetallic strip that is supported for free movement by a rigid link that is pivotally adjustable but rigidly connected to the end of the segment slide opposite that connected to the rack. The free end of the bimetallic strip may support a connector, the axis of which may be coincident with that of the pivotal connection between the rigid link and the segment slide. This connector may be attached to the end of the connecting link opposite that connected to the tip piece at the free end of the Bourdon tube. In another aspect of the invention, the temperature responsive linkage may be arranged so that increases in ambient temperature will move the slide about its pivot in a direction to compensate for the resultant of all the individual growths of the elements forming the multiplying mechanism of the gauge. In the manufacture of such gauges to meet specific specifications, it may be that the resultant effect of all increases in growth of the elements forming the multiplying mechanism due to temperature increases may cause scale error above or below datum. Therefore, another aspect of this invention may be to provide the pivotal construction of the support for the bimetallic strip so that it can be preset for correcting reading errors regardless of whether they are above or below datum.

In another aspect of this invention, the arrangement of the bimetallic strip may be such that as the ambient temperature increases thus weakening the tube, the point on the connecting link of attachment to the segment slide may move away from the slide pivot, thereby decreasing needle movement proportionately to tube weakening as the ambient temperature increases.

The above, other objects and novel features of the invention will become apparent from the following specification and accompanying drawing which is merely exemplary.

Figures 1, 2, 3:
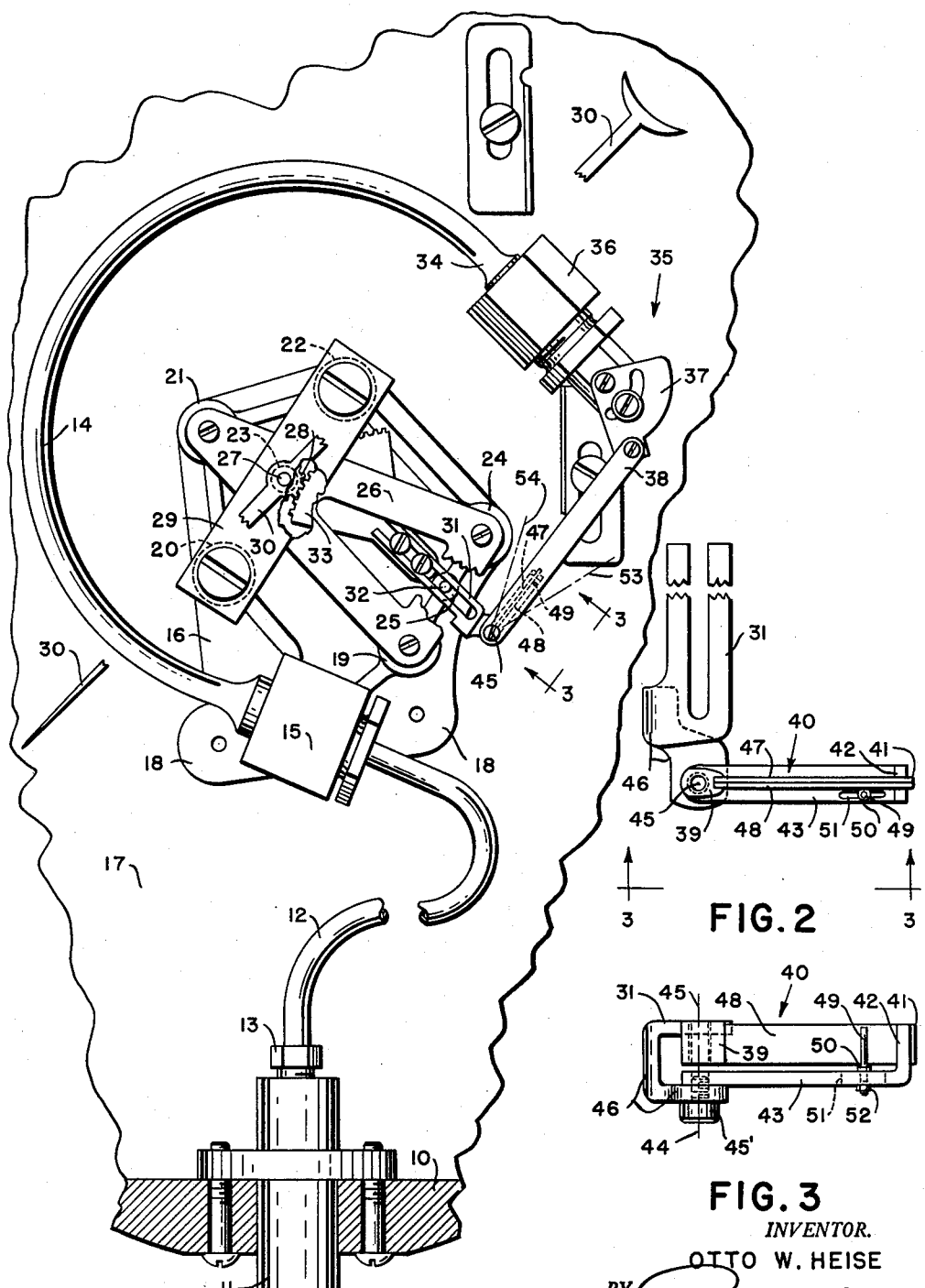
FIGURE 1 is an elevational view of a Bourdon tube gauge to which the principles of the invention have been applied.
FIG. 2 is an enlarged view of a portion of the structure shown in FIG. 1.
FIG. 3 is a view taken substantially along line 3—3 of FIGS. 1 and 2.

Referring to FIG. 1, the principles of the invention are shown as applied to a Bourdon tube gauge including a housing 10 (only a fragment of which is shown), to which is fixed a gauge inlet 11, and from which extends the conventional inlet tube 12 that is rendered pressure-tight by a fitting 13.

A Bourdon tube 14 of conventional design may have its inlet end rigidly connected to the inlet tube 12 through a tube socket 15 that is integral with a base casting 16. The base casting 16, of course, is rigidly attached to the back wall 17 of the housing 10 by screws which pass through threaded openings in case mounting lugs 18 (only two of which are shown).

The base casting 16 includes seven parallel bosses 19, 20, 21, 22, 23, 24 and 25. The bosses 19, 21 and 24 are of the same height and may support a cover plate 26. A pinion shaft 27 is mounted for oscillatable movement in a bearing within boss 23 that is aligned with a bearing within cover plate 26. A pinion 28 is fixed to the pinion shaft 27, and a dial support plate 29 having an opening for receiving pinion shaft 27 is mounted on bosses 20 and 22 in a manner to be spaced above the cover plate 26. An indicating hand 30 is fixed to the upper end of shaft 27 in the usual manner.

A segment slide 31 is fixed to a pivot shaft 32 that is mounted for oscillation in aligned bearings in boss 25 and cover plate 26. A rack segment 33 is adjustably fixed to slide 31 and it meshes with the pinion 28 that is fixed to shaft 27.

The free end 34 of the Bourdon tube 14 is closed by a tip 35 that is connected to the end 34 by a socket 36. The tip piece 35 includes an adjustable, pivotally mounted element 37 which is connected to one end of a connecting link 38. The opposite end of the link 38 may be connected to a connector 39 (FIGS. 2 and 3) that is rigidly attached to one end of a bimetallic strip 40. The strip 40 is mounted for free movement about its end 41 opposite that supporting connector 39. The end 41 is rigidly attached to a wall 42 of a link or bracket 43. While the link 43 may be of any metal or rigid material, invar metal has been found to be particularly satisfactory. The link 43 may be pivotally adjustably mounted about an axis 44 that is normally coextensive with the axis 45 of the connector 39, and may be locked in adjusted position by a screw 45' or other means such as soldering or the like to a bracket 46 at the end of the segment slide 31.

The bimetallic strip 40 may include a layer of metal 47 having a coefficient of expansion substantially greater than that of an integral layer 48 of another metal. Since the angular movement of the slide 31 is determined by the distance between the axis of shaft 32 and the axis 45, variation of this distance will affect such angular movement. Since the modulus of elasticity of the metal of tube 14 decreases with increasing temperature and corresponding weakening of the tube 14 ensues, for a given temperature and pressure range and a given tube material, it is possible to measure the error of the hand 30 throughout such ranges. Accordingly, the length of the bimetallic strip 40 can be calculated to effect movement of axis 45 away from that of shaft 32 sufficiently to decrease the angular movement of slide 31 by an amount equal to that which it is increased due to the weakening of the tube material. The maximum correcting effect will occur with the strip 40 lying in a plane including the longitudinal axis of the connecting link 38. Inasmuch as the rise in temperature effects the weakening of tube 14 proportionally to the separation of the axis of shaft 32 and axis 45, the latter compensates for the former thereby to eliminate errors in scale reading, throughout the entire pressure range thereof, and throughout the range of temperatures within which the gauge is designed to operate.

As previously described, the length of the strip 40 is calculated for a given gauge. In order to provide a way to vary the effective length of the strip 40 which may be advantageous since the calculated length of strip 40 might be slightly in error, an adjustable fulcrum point for strip 40 may be employed. Referring to FIGS. 2 and 3, a pin 49 having a shoulder 50 and a lower threaded end may pass through an elongated slot 51 within link 43 that is parallel with strip 40. A nut 52 may be threaded onto pin 49 below link 43 securely holding it in adjusted position along slot 51. The arrangement is such that pin 49 makes line contact with strip 40, and shoulder 50 does not interfere with its free movement.

It has been found that pivotally moving the strip 40 about the axis 44 to a position indicated by dot and dash line 53 on the righthand side of the longitudinal axis of link 38 will cause movement of the hand 30 in one direction from datum with the inlet 11 open to atmosphere and as the ambient temperature increases. Additionally, it has been found that angular movement of the strip 40 to a position indicated by the dot and dash line 54 on the lefthand side of the longitudinal axis of the link 38 causes the hand 30 to move in an opposite direction from datum with the inlet 11 open to atmosphere and as the ambient temperature increases.

Accordingly, in the design of a Bourdon tube gauge for given specifications, adjustment of the strip 40 can be made to compensate for any error in scale reading incident to the resultant of the growth of the various metallic elements thereof, whether it occurs due to the hand 30 moving in one or the other directions from datum as the ambient temperature increases and without pressure in tube 14. The amount of angular movement for such compensation is very slight, and in the order of only a few degrees of movement. Accordingly, such adjustment can be made without affecting the compensating effect of movement of the axis 44 away from the axis of shaft 32.

Although the various features of the new and improved pressure gauge have been shown and described in detail to fully disclose one embodiment of the invention, it will be evident that numerous changes may be made in such details, and certain features may be used by others without departing from the principles of the invention.

What is claimed is:

1. In a Bourdon tube gauge, a Bourdon tube; means for rigidly mounting one end of said tube with the other end free; indicating mechanism including a multiplying mechanism having a pivotally mounted segment slide; a segment rack connected to the one end of said slide and adapted to mesh with an indicating needle pinion; a link extending between the free end of said tube and the end of said slide opposite that connected to said rack; a bracket connected to the end of said slide opposite that connected to said rack and extending toward the free end of said tube; a bimetallic strip fixed to the free end of said bracket and extending to, and including a pivotal axis in line with the axis of the connection between said bracket and slide; and means for pivotally connecting the end of said link opposite that connected to said tube to said bimetallic strip along said pivotal axis, whereby said bimetallic strip automatically compensates throughout the entire scale of said gauge for variations in volume and linear size of said mechanism due to variations in ambient temperature.

2. In a Bourdon tube gauge, a Bourdon tube; means for rigidly mounting one end of said tube with the other end free; indicating mechanism including a multiplying mechanism having a pivotally mounted segment slide; a segment rack connected to the one end of said slide and adapted to mesh with an indicating needle pinion; a connecting link extending between the free end of said tube and the end of said slide opposite that connected to said rack; a bracket pivotally connected to the end of said slide opposite that connected to said rack and extending toward the free end of said tube; a bimetallic strip fixed to the free end of said bracket and extending to, and including a pivotal axis in line with the axis of the connection between said bracket and slide; and means for pivotally connecting the end of said link opposite that connected to said tube to said bimetallic strip along said pivotal axis, whereby said bimetallic strip automatically compensates throughout the entire scale of said gauge for variations in volume and linear size of said mechanism due to variations in ambient temperature.

3. In a Bourdon tube gauge, a Bourdon tube; means for rigidly mounting one end of said tube with the other end free; indicating mechanism including a multiplying mechanism having a pivotally mounted segment slide; a segment rack connected to the one end of said slide and adapted to mesh with an indicating needle pinion; a link extending between the free end of said tube and the end of said slide opposite that connected to said rack; a bracket connected to the end of said slide opposite that connected to said rack and extending toward the free end of said tube; a bimetallic strip fixed to the free end of said bracket and extending to, and including a pivotal axis in line with the axis of the connection between said bracket and slide; and means for pivotally connecting the end of said link opposite that connected to said tube to said bimetallic strip along said pivotal axis, whereby said bimetallic strip automatically compensates throughout the entire scale of said gauge for variations in modulus of elasticity of the metal of said tube due to variations in ambient temperature.

4. In a Bourdon tube gauge, a Bourdon tube; means for rigidly mounting one end of said tube with the other end free; indicating mechanism including a multiplying mechanism having a pivotally mounted segment slide; a segment rack connected to the one end of said slide and adapted to mesh with an indicating needle pinion; a connecting link extending between the free end of said tube and the end of said slide opposite that connected to said rack; a bracket pivotally connected to the end of said slide opposite that connected to said rack and extending toward the free end of said tube; a bimetallic strip fixed to the free end of said bracket and extending to, and including a pivotal axis in line with the axis of the connection between said bracket and slide; and means for pivotally connecting the end of said link opposite that connected to said tube to said bimetallic strip along said pivotal axis, whereby said bimetallic strip automatically compensates throughout the entire scale of said gauge for variations in modulus of elasticity of the metal of said tube due to variations in ambient temperature.

5. In a Bourdon tube gauge, a Bourdon tube; means for rigidly mounting one end of said tube with the other end free; indicating mechanism including a multiplying mechanism having a pivotally mounted segment slide; a segment rack connected to the one end of said slide and adapted to mesh with an indicating needle pinion; a link extending between the free end of said tube and the end of said slide opposite that connected to said rack; a bracket connected to the end of said slide opposite that connected to said rack and extending toward the free end of said tube; a bimetallic strip fixed to the free end of said bracket and extending to, and including a pivotal axis in line with the axis of the connection between said bracket and slide; and means for pivotally connecting the end of said link opposite that connected to said tube to said bimetallic strip along said pivotal axis, whereby said bimetallic strip automatically compensates throughout the entire scale of said gauge for variations in volume and linear size of said indicating mechanism on the one hand and for variations in modulus of elasticity of the tube material on the other hand due to variations in ambient temperature.

6. In a Bourdon tube gauge, a Bourdon tube; means for rigidly mounting one end of said tube with the other end free; indicating mechanism including a multiplying mechanism having a pivotally mounted segment slide; a segment rack connected to the one end of said slide and adapted to mesh with an indicating needle pinion; a connecting link extending between the free end of said tube and the end of said slide opposite that connected to said rack; a bracket pivotally connected to the end of said slide opposite that connected to said rack and extending toward the free end of said tube; a bimetallic strip fixed to the free end of said bracket and extending to, and including a pivotal axis in line with the axis of the connection between said bracket and slide; and means for pivotally connecting the end of said link opposite that connected to said tube to said bimetallic strip along said pivotal axis, whereby said bimetallic strip automatically compensates throughout the entire scale of said gauge for variations in volume and linear size of said indicating mechanism on the one hand and for variations in modulus of elasticity of the tube material on the other hand due to variations in ambient temperature.

7. In a Bourdon tube gauge, a Bourdon tube; means for rigidly mounting one end of said tube with the other end free; indicating mechanism including a multiplying mechanism having a pivotally mounted segment slide; a segment rack connected to the one end of said slide and adapted to mesh with an indicating needle pinion; a link extending between the free end of said tube and the end of said slide opposite that connected to said rack; a bracket connected to the end of said slide opposite that connected to said rack and extending toward the free end of said tube; a bimetallic strip fixed to the free end of said bracket and extending to, and including a pivotal axis in line with the axis of the connection between said bracket and slide means for pivotally connecting the end of said link opposite that connected to said tube to said bimetallic strip along said pivotal axis, whereby said bimetallic strip automatically compensates throughout the entire scale of said gauge for variations in volume and linear size of said indicating mechanism on the one hand and for variations in modulus of elasticity of the tube material on the other hand due to variations in ambient temperature and an adjustable fulcrum on said bracket for varying the effective length of said bimetallic strip.

8. In a Bourdon tube gauge, a Bourdon tube; means for rigidly mounting one end of said tube with the other end free; indicating mechanism including a multiplying mechanism having a pivotally mounted segment slide; a segment rack connected to the one end of said slide and adapted to mesh with an indicating needle pinion; a connecting link extending between the free end of said tube and the end of said slide opposite that connected to said rack; a bracket pivotally connected to the end of said slide opposite that connected to said rack and extending toward the free end of said tube; a bimetallic strip fixed to the free end of said bracket and extending to, and including a pivotal axis in line with the axis of the connection between said bracket and slide; means for pivotally connecting the end of said link opposite that connected to said tube to said bimetallic strip along said pivotal axis, whereby said bimetallic strip automatically compensates throughout the entire scale of said gauge for variations in volume and linear size of said indicating mechanism on the one hand and for variations in modulus of elasticity of the tube material on the other hand due to variations in ambient temperature and an adjustable fulcrum on said bracket for varying the effective length of said bimetallic strip.

References Cited in the file of this patent

UNITED STATES PATENTS

| | | |
|---|---|---|
| 2,087,494 | Annin | July 20, 1937 |
| 2,162,308 | Jenny | June 13, 1939 |
| 2,194,624 | Titterington | Mar. 26, 1940 |
| 2,325,091 | Allwein et al. | July 27, 1943 |
| 2,387,909 | Ingram | Oct. 30, 1945 |

OTHER REFERENCES

Article, "Thermal Compensator for Bourdon Gauges," by Otto W. Heise, Instruments and Automation, March 1958, page 473.